Aug. 7, 1956  K. A. KLINGLER  2,757,948
GASKETS FOR RAILROAD JOURNAL BOX COVERS
Filed Oct. 15, 1952  2 Sheets-Sheet 1
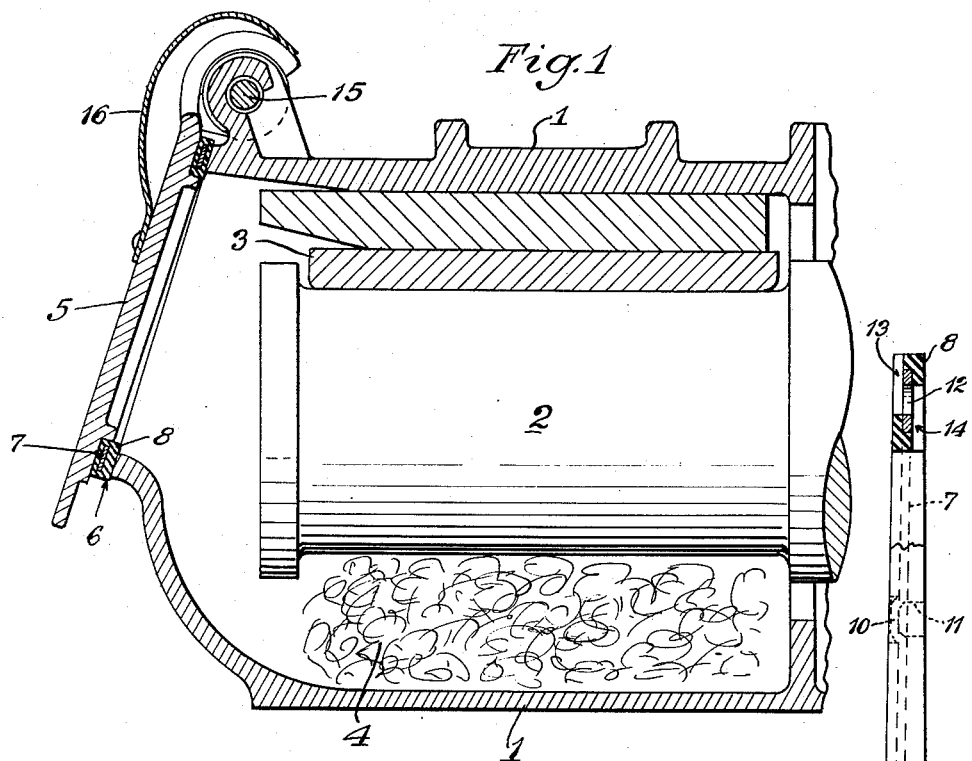
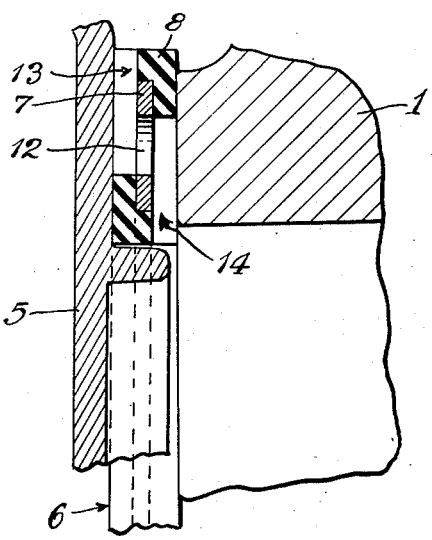
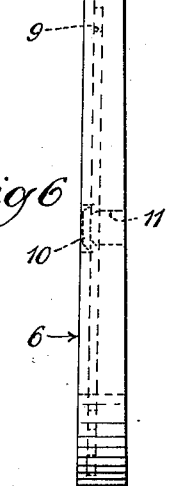
Inventor
Karl A. Klingler
by Parker & Carter
Attorneys Aug. 7, 1956　　　K. A. KLINGLER　　　2,757,948
GASKETS FOR RAILROAD JOURNAL BOX COVERS
Filed Oct. 15, 1952　　　　　　　　　　2 Sheets-Sheet 2
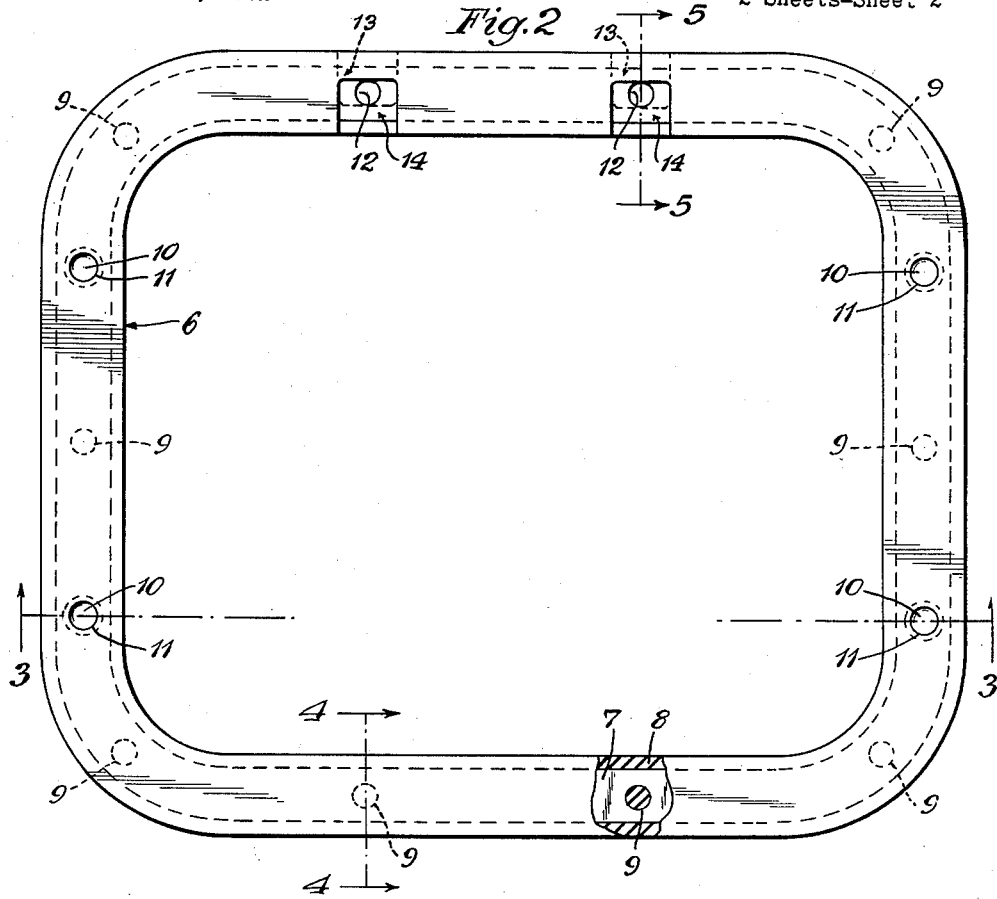
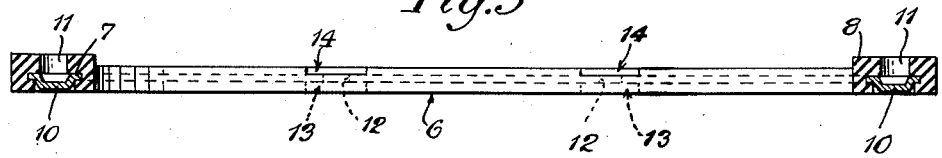
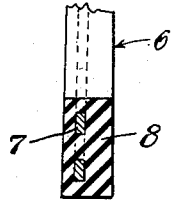
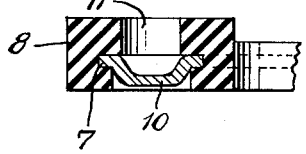
Inventor
Karl A. Klingler
by Parker Carter
Attorneys

United States Patent Office 2,757,948
Patented Aug. 7, 1956

2,757,948

GASKETS FOR RAILROAD JOURNAL BOX COVERS

Karl A. Klingler, Naperville, Ill.

Application October 15, 1952, Serial No. 314,780

5 Claims. (Cl. 288—29)

My invention relates to improvements in gaskets for railroad journal box covers and the like and has for one object to provide a new and improved form of gasket which can be easily, accurately and inexpensively manufactured and which can be easily and cheaply attached to the journal box cover.

One object of my invention is to provide a gasket for journal box covers which compensates for wear and minimizes vibration of the cover.

Another object of my invention is to provide a novel means for sealing a gasket against a journal box cover as the gasket is applied to the cover.

A further object of this invention is to provide a gasket which insures uniform distribution of pressure between the journal box cover and the journal box proper.

Another object is to provide a gasket which will incorporate without change in the journal box lid a breather aperture which will permit the contents of the journal box to breathe but which will prevent or adequately minimize the entrance of foreign substance through the breather.

Journal boxes for railroad trucks and the like are habitually of cast metal and have an opening through which the journal brasses may be inserted and through which the waste or other oil holding material contained in the box may be renewed, inspected and provided with necessary lubricant. The cover which closes the opening must fit sufficiently tight to prevent entrance of water, dust from the road bed and the like and since the journal box is a rough casting, it is highly desirable to have a gasket between the cover and the box to compensate for rough, opposed surfaces and the like. By providing a gasket which includes the breather aperture, it becomes possible to accomplish the object of sealing the journal box while permitting breathing without important or extensive changes in the journal box or the journal box cover, thereby accomplishing what is needed at very low cost.

My invention is illustrated more or less diagrammatically in the accompanying drawings, wherein:

Fig. 1 is a diagrammatic section through a journal box cover and journal box;

Fig. 2 is a plan view of my journal box cover gasket;

Fig. 3 is a section along the line 3—3 of Fig. 2;

Fig. 4 is a section along the line 4—4 of Fig. 2;

Fig. 5 is a section along the line 5—5 of Fig. 2;

Fig. 6 is a side elevation of the gasket in part section; and

Fig. 7 is an enlarged illustration of one portion of the gasket shown in Fig. 3.

Like parts are indicated by like characters throughout the specification and drawings.

1 is the journal box, 2 the axle, 3 the brass, and 4 the oil impregnated waste. The opening in the outer end wall of the journal box is closed by the hinged journal box cover 5.

While not shown in the drawings, it will be understood that the cover 5 will be biased towards closed position by any suitable resilient means. A common form of such resilient means is a coiled spring having one end portion in contact with the cover and another end portion carrying a roller which contacts a cam on the journal box, the arrangement being such as to hold the cover in closed position and also hold the cover in open position. Such a resilient means forms no part of my invention but is described herein to show an important aspect of my invention.

The journal box cover may be flat if desired but preferably is of the contour indicated in Fig. 1. Whether it is flat or channeled as indicated, the cover gasket 6 encircles the cover adjacent the outer periphery and conforms in shape and size to the opening in the journal box so that when the cover is in the closed position, the cover gasket 6 engages the wall of the journal box 1 and makes a seal between the box and the cover.

The gasket 6 includes a reinforcing ring 7 embedded in the rubber or rubber-like or elastomeric flexible compressible gasket material indicated at 8. Ring 7 has a plurality of perforations 9 extending therethrough. Bosses 10 extend laterally from one side of the reinforcing ring, projecting a distance from the ring on their outer surfaces substantially equal to the thickness of the rubber or elastomeric gasket material enveloping the ring, the elastomeric material being relieved on the opposite side of the ring in opposition to the bosses as indicated at 11.

The bosses 10 are so spaced that their outer surfaces are spaced a slight distance, preferably 1/32", from the adjacent plane surface of the gasket, as will be apparent in Fig. 7.

When the gasket is to be applied to the journal box cover, it is laid upon the cover so that it generally conforms to the outer boundary of the cover, is pressed against the cover and the bare surfaces at 10 contacting the cover as they do may be then spot welded to the box cover. If spot welding machines are not available, holes may be drilled in the box cover in register with the offset bosses and drive screws may be driven through the gasket reinforcing ring and into the cover to hold the two together.

In either method of fastening the gasket to the cover, the outer surfaces of the bosses 10 contact the surface of the cover. Thus, when the gasket is applied to the cover, the aforementioned clearance between the outer surface of the boss and the adjacent surface of the gasket requires compression of the gasket. When permanently fastened to the cover the gasket remains under compression, insuring a permanent tight seal between the gasket and cover.

The offset bosses have also an additional function. When the gasket is to be molded, the offset bosses contact the wall of the mold, hold the reinforcing ring in proper position so that there is ample clearance between the ring and the walls of the mold for the plastic, rubber or elastomeric material to penetrate between the reinforcing ring and the mold wall to insure the formation of a continuous rubber shell about the reinforcing ring. Thus the reinforcing ring carries its own positioning elements in the mold and no separate positioning or anchorage means are needed. The holes 9 through the reinforcing ring insure that the rubber or elastomeric material will extend not merely around but through the body of the reinforcing ring. Thus, material is permanently and positively held in position about the reinforcing ring member.

The above arrangement provides a gasket which makes a proper seal between the journal box and the journal box cover, the gasket being held permanently in place on the underside of the cover whether the cover is grooved or channeled to receive the gasket or not. If the cover is grooved or channeled, all the assembler needs to do is to seat the gasket in the groove and then attach it to the cover by spot welding, bolting or any other suitable means. However, if the journal cover is flat without any groove, nevertheless all the assembler has to do is to so position the gasket before he fastens it to the cover that when the cover is closed, the gasket contacts the entire periphery of the lubrication opening in the end wall of the journal box.

Referring now to Fig. 5, it will be noted that the reinforcing ring 7 along the upper portion of the cover is additionally apertured at 12. The compressible gasket material on the side of the gasket engaging the cover is cut away, as indicated at 13, and the opposite side of the elastomeric covering mantle is cut away on the journal box side, as at 14. The cover is hinged to the journal box at 15 and carries a thin, more or less flexible shield 16 which overhangs and masks the hinge. This shield also overhangs and masks that portion of the gasket where it is relieved at 13 and the gasket extends upwardly above the outer surface of the journal box. This masking member 15 overhangs the tortuous channel comprising cut away portion 13, aperture 12 and cut away portion 14 through which the journal box may breathe. This tortuous passage is open at both ends, the cut away portion 13 communicating with the atmosphere, the cut away portion 14 communicating with the interior of the journal box. Water, dust and the like may travel along the exposed surfaces of the journal box but will be dammed up against the upwardly projecting portion of the gasket. The surface of the journal box is usually curved and any such material will run off on both sides and will not climb over the gasket to enter the relieved portion or aperture 13 and because of the shield 16, the likelihood of direct entrance from above of foreign material into the opening 13 is exceedingly remote.

As will be apparent in Fig. 6, the gasket increases in thickness from its upper end to its lower end. Assuming that the upper end may have any desired thickness, the lower end has a thickness such as to insure contact of the lower end of the gasket with the journal box when the upper end contacts the upper end of the journal box. This feature provides for uniform distribution of pressure in the gasket.

This is highly advantageous in view of the fact that as the hinge members and cover biasing mechanism become worn excessive vibrations are set up in the cover. Due to the resiliency of the gasket material and the uniform distribution of pressure on the gasket, the gasket compensates for this vibration and provides a tight seal regardless of wear and attendant play in the cover-supporting and biasing mechanism.

Thus the gasket insures a tight seal between the cover and the journal box. The construction is such as to insure a tight seal even when the surfaces of the cover and box are formed of relatively rough castings. One gasket, without change in the journal box cover may be applied to the cover and at one and the same time effectively seal the box to keep necessary lubricant within the box while keeping foreign material out and provide necessary breathing apertures.

While it will be realized that I have shown and described an operative device, I wish it to be understood that this showing is illustrative and is to be taken in a diagrammatic sense and not in any limiting sense, that there are many modifications falling within the scope and spirit of the invention that will be apparent to those skilled in the art; the scope of the invention, therefore, should be limited only by the scope of the hereinafter appended claims.

I use the term "elastomeric" as a general term covering natural rubber, synthetic rubber or other compounds or materials which have in general the same physical characteristics as natural rubber.

I claim:

1. A gasket for railroad journal box covers and the like comprising a thin, flat, continuous metal reinforcing ring, the ring being generally rectangular in plan view including four straight sides joined by curved portions, a plurality of bosses, each integral with and offset in the same direction from the ring, an elastomeric flexible, compressible mantle enclosing the ring, the mantle being apertured on both sides in register with each such boss, the bosses projecting from the ring such a distance that when the bosses are in contact with a plane surface such as the box cover, the material of the mantle between the ring and the cover is under compression, the mantle encircling one of the straight portions of the ring being thinner than the mantle enclosing the opposite straight portion of the ring, the two other side portions increasing in thickness gradually from the thin to the thick portion of the mantle, the thickness of the mantle throughout the entire ring area being uniform on the side of the ring from which the bosses project.

2. A gasket including a flat, reinforcing metal ring, an elastomeric flexible compressible mantle enclosing the ring, the ring and mantle thus defining a gasket adapted to encircle a relatively widely extended aperture, the body of the reinforcing ring being apertured, there being a channel defined in one face of the mantle extending from the inner periphery of the mantle and registering with the inner end with the aperture in the reinforcing ring, the opposite face of the mantle being similarly channeled, the channel extending from the outer periphery of the mantle to register with the aperture in the ring.

3. A gasket including a thin flat continuous metal reinforcing ring, a plurality of bosses projecting from one face of the ring only, an elastomeric compressible mantle entirely enclosing the reinforcing ring except where it is in alignment with the bosses, the thickness of the mantle on the face of the ring from which the bosses project being substantially the same as the distance to which the bosses project, the distance between the face of the mantle opposite to the face through which the bosses project and the reinforcing ring increasing from a minimum at one side of the ring to a maximum at the other.

4. A gasket including a thin flat continuous metal reinforcing ring, a plurality of bosses projecting from one face of the ring only, an elastomeric compressible mantle entirely enclosing the reinforcing ring except where it is in alignment with the bosses, the thickness of the mantle on the face of the ring from which the bosses project being substantially the same as the distance to which the bosses project, the mantle on the opposite face of the ring being relieved in opposition to each boss whereby both sides of each boss are exposed through the mantle.

5. A gasket including a thin flat continuous metal reinforcing ring, a plurality of bosses projecting from one face of the ring only, an elastomeric compressible mantle entirely enclosing the reinforcing ring except where it is in alignment with the bosses, the thickness of the mantle on the side face of the ring from which the bosses project being substantially the same as the distance to which the bosses project, the mantle on the opposite face of the ring being relieved in opposition to each boss whereby both sides of each boss are exposed through the mantle, the bosses comprising an integral portion of the ring material laterally offset whereby the bosses and body of the ring define a partition across the opening in the mantle where it is aligned with the bosses.

References Cited in the file of this patent

UNITED STATES PATENTS

| | | |
|---|---|---|
| 913,371 | Gamage | Feb. 23, 1909 |
| 1,436,738 | Underhill | Nov. 28, 1922 |
| 2,054,210 | Weisenburg | Sept. 15, 1936 |
| 2,155,259 | Dickson | Apr. 18, 1939 |
| 2,498,245 | Bryant | Feb. 21, 1950 |
| 2,532,891 | Chupp | Dec. 5, 1950 |

FOREIGN PATENTS

| | | |
|---|---|---|
| 490 | Great Britain | of 1859 |
| 200,769 | Great Britain | July 19, 1923 |